United States Patent
Gawith et al.

(10) Patent No.: US 8,064,129 B2
(45) Date of Patent: Nov. 22, 2011

(54) PROCESS FOR POLING A FERROELECTRIC MATERIAL DOPED WITH A METAL

(75) Inventors: Corin Barry Edmund Gawith, Southampton (GB); Peter George Robin Smith, Highfield Southampton (GB); Huw Edward Major, Southampton (GB)

(73) Assignee: University of Southampton, Highfield, Southampton (GB)

( * ) Notice: Subject to any disclaimer, the term of this patent is extended or adjusted under 35 U.S.C. 154(b) by 0 days.

(21) Appl. No.: 12/735,478

(22) PCT Filed: Feb. 9, 2009

(86) PCT No.: PCT/GB2009/000358
§ 371 (c)(1),
(2), (4) Date: Jul. 20, 2010

(87) PCT Pub. No.: WO2009/101390
PCT Pub. Date: Aug. 20, 2009

(65) Prior Publication Data
US 2010/0288983 A1     Nov. 18, 2010

(30) Foreign Application Priority Data
Feb. 15, 2008 (GB) .................. 0802852.4

(51) Int. Cl.
*G02F 1/23* (2006.01)

(52) U.S. Cl. ......... 359/328; 359/280; 359/282; 385/122
(58) Field of Classification Search .................. 359/280, 359/282, 326–332; 385/122; 372/21–22
See application file for complete search history.

(56) References Cited

U.S. PATENT DOCUMENTS

| | | | |
|---|---|---|---|
| 5,615,041 A * | 3/1997 | Field et al. ................... 359/326 |
| 6,555,293 B1 * | 4/2003 | Fejer et al. .................... 430/311 |
| 6,731,422 B2 * | 5/2004 | Yamaguchi et al. .......... 359/332 |
| 6,952,307 B2 * | 10/2005 | Apostolopoulos et al. ... 359/321 |
| 7,145,714 B2 * | 12/2006 | Roberts et al. ................ 359/326 |
| 7,486,432 B2 * | 2/2009 | Chu et al. ...................... 359/321 |
| 2001/0055144 A1 | 12/2001 | Mizuyoshi |
| 2005/0133477 A1 | 6/2005 | Esseian |

FOREIGN PATENT DOCUMENTS
EP     1 657 590 A     5/2006

* cited by examiner

*Primary Examiner* — Daniel Petkovsek
(74) *Attorney, Agent, or Firm* — Iandiorio Teska & Coleman

(57) ABSTRACT

A process for poling a ferroelectric material doped with a metal, which process comprises: (i) defining an electrode pattern on a −z face of a crystal of the ferroelectric material doped with the metal; (ii) providing an electrode material; (iii) poling at a temperature of not more than 45° C.; and (iv) poling by a two-stage voltage-controlled application of electric field based on a first poling stage of domain nucleation and a second poling stage of domain spreading.

11 Claims, 1 Drawing Sheet

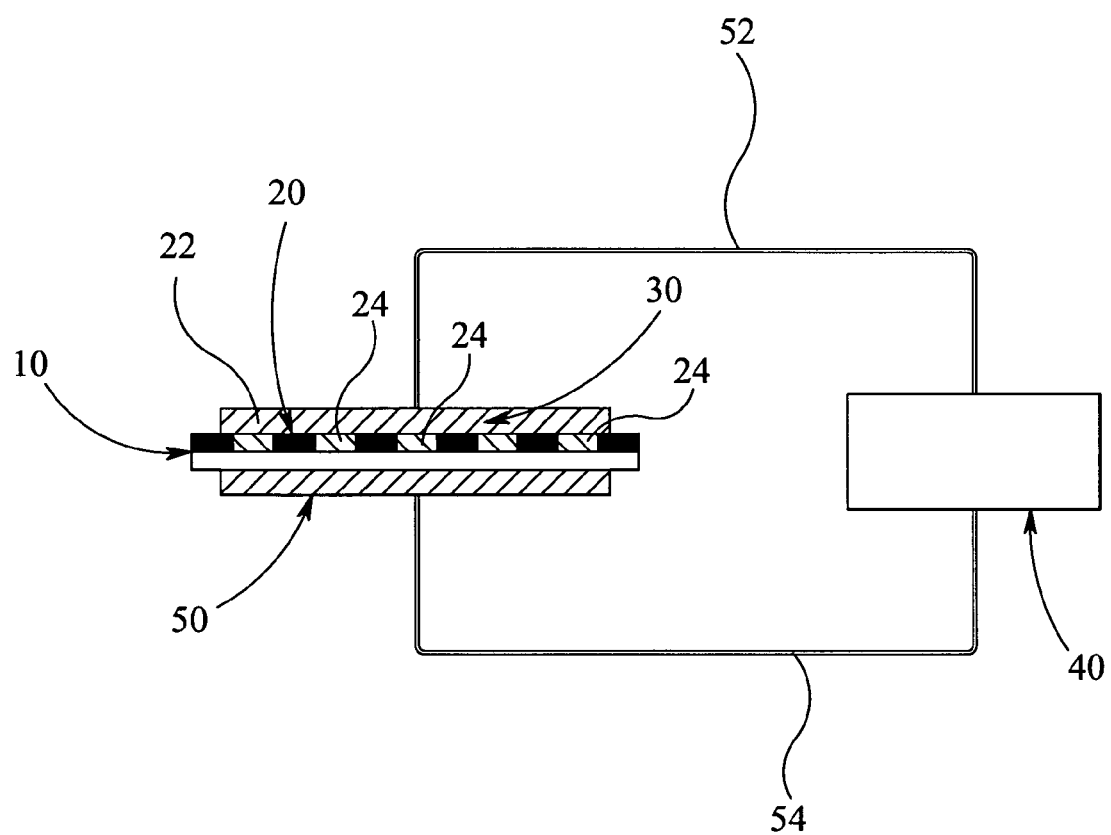

PROCESS FOR POLING A FERROELECTRIC MATERIAL DOPED WITH A METAL

This invention relates to a process for electric field poling of ferroelectric materials and, more especially, this invention relates to a process for poling a ferroelectric material doped with a metal.

Non-linear optical devices are useful in the field of optics for converting laser light between different wavelengths. One example of the conversion of the laser light includes second harmonic generation in which two photons combine to create a new photon at twice the frequency (half the wavelength). Another example of the conversion of the laser light is optical parametric generation in which a single photon splits into two photons at longer wavelengths. Processes converting laser light between different wavelengths need to conserve photon energy and be phase-matched in order to achieve useful efficiencies. The requirement for phase-matching is that the phase velocities of the interacting waves in the non-linear material must be equal. One phase-matching technique makes use of birefringence in a crystalline material to achieve efficient interaction. An alternative phase-matching technique is based on the concept of quasi-phasematching in which the difference in phase velocities of the interacting waves is compensated by a periodic reversal of the nonlinear coefficient of the crystal. This periodic reversal can be achieved by many techniques, the most common of which uses an approach known as periodic poling. In this approach of periodic poling, a high voltage pulse is applied to a ferroelectric material using a patterned electrode to create a corresponding pattern of domain reversals.

For second harmonic generation to visible wavelengths, it is desirable to use materials with a high non-linearity and resistance to photorefractive damage. In periodically poled materials, the highest conversion efficiency is achieved in first order quasi-phasematched gratings where the period required for each non-linear interaction is material and wavelength dependent. For second harmonic generation to visible wavelengths, first order gratings typically feature periods between 2 μm and 15 μm or less, and can be referred to as small-pitch gratings.

Many published processes for periodic poling are based on the process described in U.S. Pat. No. 5,193,023. The process disclosed in this USA patent uses a pair of electrodes formed on opposite major surfaces of a ferroelectric substrate. One of the surfaces is patterned according to the desired domain reversal pattern, for application of a DC voltage across the substrate in order to create a pattern of domains of opposite polarisation direction. In order to produce domain inversion, the voltage must exceed a so-called coercive voltage for the ferroelectric material being used.

Periodic domain reversal is known in several ferroelectric crystal families including, for example, periodically poled lithium niobate, periodically poled lithium tantalate, and periodical poled potassium-titanyl-phosphate. While each of these ferroelectric crystal families has relative advantages and disadvantages, the periodically poled lithium niobate crystal family remains a popular choice for frequency conversion applications because lithium niobate is known to have the largest non-linearity of all ferroelectric crystals.

One material that is attractive for second harmonic generation is magnesium doped lithium niobate (Mg doped $LiNbO_3$). This is because adding a few percent of magnesium to a melt from which lithium niobate is grown has been shown significantly to reduce the photorefractive effect in this material. This is due to an increase in photoconductivity of approximately one hundred times greater than in the undoped material. Reducing the photorefractive effect in this way allows a more stable operation at visible wavelengths, and also allows periodically poled devices to be designed for use at lower temperatures than if a similar undoped crystal were to be used. Magnesium doping is also known to reduce the coercive voltage of lithium niobate, and to change the poling characteristics of the lithium niobate. Typical dopant concentrations of 1-7 Mol % are used in the magnesium doped lithium niobate, with best photorefractive resistance being at approximately 5 Mol %.

From a production perspective, it is desirable to perform electric field poling in ambient conditions close to room temperature because this reduces process complexity and cost. Also, it is desirable to use a process with liquid gel electrodes as these electrodes do not require additional deposition and removal steps associated with metal electrodes. For second harmonic generation in magnesium doped lithium niobate, it is desirable to produce periodically poled gratings with an equal mark-to-space ratio and first order quasi-phasematching period. It is also desirable to perform domain inversion across the entire crystal thickness in order to increase available aperture size. The combination of small-pitch gratings and full thickness domain inversions is desirable for higher conversion efficiencies.

It is an aim of the present invention to provide a process for the periodic poling of a ferroelectric material doped with a metal, and which process satisfies at least some of the above mentioned desirable production requirements.

Accordingly, the present invention provides a process for poling a ferroelectric material doped with a metal, which process comprises:

(I) defining an electrode pattern on a −z face of a crystal of the ferroelectric material doped with the metal;

(II) providing an electrode material;

(III) poling at a temperature of not more than 45° C.; and (Iv) poling by a voltage-controlled electric field which is applied in two stapes comprising a first poling stage of domain nucleation and a second poling stage of domain spreading, and wherein the second poling stage of domain spreading comprises a series of one or more pulses of 3-5 kV/mm with a duration of 1-100 minutes.

With the process of the present invention, the two-stage poling of domain nucleation followed by domain spreading is believed to be unique. The two-stage poling enables the achievement of small-pitch full-thickness domain inverted patterns in the ferroelectric material doped with the metal. The process of the present invention is able to be carried out at ambient temperatures, thereby reducing process complexity and cost.

The electrode pattern may be any domain pattern designed to achieve phase matching properties. Preferably, the electrode pattern is a periodic electrode pattern. However, for some applications, it may be desirable to have a more complex pattern than simple alternative positive and negative domains afforded by a periodic electrode pattern.

Preferably, the process is one in which the ferroelectric material is lithium niobate, lithium tantalate or potassium-titanyl-phosphate. Other ferroelectric materials may be used.

The process may be one in which the metal is an alkaline earth metal or a transition metal. Preferably, the alkaline earth metal is magnesium. Preferably, the transition metal is zinc or hafnium. Other alkaline earth metals and other transition metals may be employed. Preferably, the crystal of the ferroelectric material is doped with more than 4 Mol % of the magnesium. For other metals, different molecular percentages may be employed.

The process may be one in which the first poling stage of domain nucleation comprises poling a series of more than 1 pulse using voltages of 8-10 kV/mm, a pulse duration of 1-10 ms with an on/off cycle where the time that the pulse is off is longer than 50%.

The process may be one in which the electrode material is in the form of a gel, a liquid or a metal. Gels and liquids are preferred to metals because they are able to avoid the deposition and removal steps associated with the use of metal electrodes. A gel is a preferred electrode material because it is both easy to apply and remove. The gel may be a lithium chloride gel or a gel based on an organic ion. The liquid may be a lithium chloride liquid.

In order to facilitate a full and complete understanding of the present invention, reference will now be made to the accompanying Example.

EXAMPLE

A ferroelectric crystal was prepared with an insulator structure appropriate for poling. This was effected by cleaning, spin coating the ferroelectric crystal with a layer of photoresist, photolithographic exposure with an appropriate mask aligner and mask, and development of the photoresist pattern.

The ferroelectric crystal was 0.5 mm thick z cut optical grade 5 Mol % magnesium doped lithium niobate in a three inch diameter wafer format with both z faces polished to an optical finish.

The insulator pattern was applied to the −z face of the wafer in Shipley S1813 photoresist. The photolithography that was used defined 6.7 µm period patterns in the photoresist with 15-25% of the period defined as openings. The wafer was then placed in a holder with electrical contact made to the patterned −z face of the wafer and the unpatterned +z face of the wafer using a conductive gel as electrode material.

The ferroelectric crystal was placed in the holder with the electric contact to the patterned face, and also to a plain electrode on the opposing face. The electrical contact was made using the conductive gel. Typically, the −z face of the crystal is then patterned.

Room temperature poling was conducted as a two-stage voltage controlled application of electric field. The first poling stage was that of domain nucleation. The first poling stage of domain nucleation comprised using a series of voltage pulses to form small domain inverted areas positioned at the corners of each patterned electrode (where the electric field is well known to be typically highest) that transversed the entire thickness of the ferroelectric crystal. The voltage used was 5 kV. The pulse duration used was 1 ms with an on/off duty cycle ratio of 30:70. Several tens of pulses were used depending upon the desired patterned area to be poled.

During the first poling stage of domain nucleation, the voltage of the pulse series was chosen to be higher than the coercive voltage of the material, but lower than the voltage required to cause conductive breakdown or damage to the ferroelectric crystal. The duration and repetition rate of the pulse series was chosen to be short enough to form domain inverted sites without merging between periods of the domain pattern, but long enough to ensure that the poled sites traverse the entire thickness of the ferroelectric crystal. The number of pulses used in the first poling stage of domain nucleation were chosen to ensure that poled nucleation sites were formed at the ends of every patterned electrode. This depended upon the size and layout of the patterned area.

At the end of the first poling stage of domain nucleation, the above mentioned formation of small domains at the corners of each patterned electrode could be seen on both surfaces of the crystal using a cross-polarising optical microscope. These small domains are typically visible as arrays of poled spots that are present at the edges of each electrode in the defined grating pattern.

The second poling stage of the domain spreading was then conducted using a single voltage pulse to propagate the poled areas formed during the nucleation such that the poled areas spread and merged to fill the area defined by the electrode pattern. During this second stage of domain spreading, the voltage was chosen to be large enough to promote spreading of the nucleated domain pattern, but low enough to prevent significant domain expansion under the insulating pattern. This was important in order to allow control of the grating mark-to-space ratio. The domain spreading voltage was adjusted to promote different rates of domain propagation. The voltage is determined by material composition and thickness. The voltage used was 2.2 kV for several minutes depending upon the desired patterned area to be poled.

Both the first poling stage of domain nucleation and the second poling stage of domain spreading were performed at room temperatures of between 18-35° C. and in ambient conditions.

After the poling, the gel and photoresist pattern were cleaned from the wafer. The wafer was subsequently etched in hydrofluoric acid to allow optical and physical inspection of the domain inverted patterns. The process was shown to produce high quality gratings with near equal mark-to-space ratio that traverse the entire thickness of the crystal. Small-pitch full-thickness periodical domain inverted patterns were achieved in the magnesium doped lithium niobate.

In order further to facilitate a full and complete understanding of the present invention, reference will now be made to the accompanying drawing which is a side view of poling apparatus being used on a ferroelectric crystal of lithium niobate.

Referring to the drawing, there is shown a wafer 10 of lithium niobate which has been doped with a metal. The metal may be an alkaline earth metal such for example as magnesium, or a transition metal such for example as zinc or hafnium. The doping is to reduce photorefractive damage. The wafer 10 may be of a composition which is congruent or stiochiometric.

The wafer 10 is typically a z-cut sample. The wafer 10 is in the form of a disc, with a thickness of 500 microns, but which may increase up to a few mm in thickness. The lateral size of the wafer 10 is chosen to prevent electrical breakdown occurring around the wafer 10. The prevention of this electrical breakdown may typically require that the wafer 10 is at least 5 mm larger than the desired poled grating. The wafer 10 may be, for example, 7.62 cm.

An electrode structure 20 is defined by photolithography on the −z face of the wafer 10. More specifically, photoresist 22 is applied to the −z face of the wafer 10 in order to create a series of openings 24 in photoresist 22. An electrode 30 is then deposited over the photoresist 22 as shown, with the material of the electrode 30 extending into the openings 24 and contacting the −z face of the wafer 10. The electrode 30 is preferably a gel but it may alternatively be a liquid or a metal. Preferably the electrode 30 is a conductive gel.

A high voltage supply 40 provides a programmed high voltage which is programmed by an external means such for example as a computer or a signal generator. When the voltage is pulsed, the exposed parts of the wafer 10 are poled.

Also shown in the drawing is an electrode 50. The electrode 50 is typically plain with no pattern. The electrode 50 is applied to the +z face of the wafer 10. The electrode 50 is made of the same material as the electrode 30. The electrodes 30, 50 are connected to the high voltage supply 40 by leads 52, 54 as shown.

It is to be appreciated that the embodiments of the invention described above with reference to the Example and the drawing have been given by way of example only and that modifications may be effected. Thus, for example, the lithium niobate could alternatively be doped with a transition metal such for example as zinc or hafnium. The electrode material may be a liquid or a metal instead of the gel. Other sizes of lithium niobate crystal may be employed. Crystals of a ferroelectric material other than lithium niobate may be employed so that, for example, the crystal may be a lithium tantalate crystal or a potassium-titanyl-phosphate crystal. The photolithography may be applied on the +z face of the wafer 10. Various electrode configurations may be used.

The invention claimed is:

1. A process for poling a ferroelectric material doped with a metal, which process comprises:
   (i) defining an electrode pattern on a −z face of a crystal of the ferroelectric material doped with the metal:
   (ii) providing an electrode material;
   (iii) poling at a temperature of not more than 45° C.; and
   (iv) poling by a voltage-controlled electric field which is applied in two stages comprising a first poling stage of domain nucleation and a second poling stage of domain spreading, and wherein the second poling stage of domain spreading comprises a series of one or more pulses of 3-5 kV/mm with a duration of 1-100 minutes.

2. A process according to claim 1 in which the electrode pattern is a periodic electrode pattern.

3. A process according to claim 1 in which the ferroelectric material is lithium niobate, lithium tantalite or potassium-titanyl-phosphate.

4. A process according to claim 1 in which the metal is an alkaline earth metal or a transition metal.

5. A process according to claim 4 in which the alkaline earth metal is magnesium.

6. A process according to claim 5 in which the crystal of the ferroelectric material is doped with more than 4 Mol % of the magnesium.

7. A process according to claim 4 in which the transition metal is zinc or hafnium.

8. A process according to claim 1 in which the first poling stage of domain nucleation comprises a series of more than one pulse using voltages of 8-10 kV/mm, and a pulse duration of 1-10 ms with an on/off cycle where the time the pulse is off is longer than 50%.

9. A process according to claim 1 in which the electrode material is in the form of a gel, a liquid or a metal.

10. A process according to claim 9 in which the gel is a lithium chloride gel or a gel based on an organic ion, and in which the liquid is a lithium chloride liquid.

11. Periodically poled ferroelectric material doped with a transition metal, when produced by a process according to claim 1.

* * * * *